United States Patent [19]

Kataoka et al.

[11] Patent Number: 4,903,524

[45] Date of Patent: Feb. 27, 1990

[54] METHOD OF AND APPARATUS FOR DETECTING BUBBLES FROM HERMETIC CONTAINER AND METHOD OF DETECTING LEAK IN HERMETIC CONTAINER

[75] Inventors: Shotaro Kataoka; Yoshio Hasegawa; Hisashi Muroda, all of Sagamihara, Japan

[73] Assignee: Kayaba Industry Co., Ltd., Tokyo, Japan

[21] Appl. No.: 321,864

[22] Filed: Mar. 10, 1989

[51] Int. Cl.$^4$ ............................................. G01M 3/06
[52] U.S. Cl. ........................................ 73/45.5; 73/41.2
[58] Field of Search ................... 73/45.5, 41.2, 49.3, 73/52

[56] References Cited

U.S. PATENT DOCUMENTS

| 3,516,284 | 6/1970 | Lockard | 73/45.5 |
| 3,590,256 | 6/1971 | Neeff | 73/52 X |
| 4,616,503 | 10/1986 | Plungis et al. | 73/55 |

FOREIGN PATENT DOCUMENTS

| 1471239 | 1/1967 | France | 73/45.5 |
| 54832 | 4/1982 | Japan | 73/45.5 |
| 127140 | 7/1982 | Japan | 73/45.5 |
| 896441 | 1/1982 | U.S.S.R. | 73/45.5 |
| 977967 | 11/1982 | U.S.S.R. | 73/45.5 |

Primary Examiner—John Chapman
Assistant Examiner—Joseph W. Roskos
Attorney, Agent, or Firm—Fleit, Jacobson, Cohn, Price, Holman & Stern

[57] ABSTRACT

Disclosed is a method of detecting bubbles issuing from a hermetic container. A hermetic container, i.e., an object to be measured, is immersed in a liquid, and pressurized air is applied to this hermetic container to produce bubbles from a leaking portion. The bubbles are allowed to pass between a pair of optical fibers provided with a gap therebetween. At that time, a light beam emitted from one optical fiber and received by the other optical fiber is radiated across the intended pathway of the bubbles. When the light beam passes through the bubbles, the beam is diffused by the difference in density between the liquid and the bubbles, a reduced part of it is received by the other optical fiber, and the amount of light thus received is converted to an electrical signal. In addition, an apparatus for detecting bubbles for implementing this method is also disclosed.

5 Claims, 3 Drawing Sheets

METHOD OF AND APPARATUS FOR DETECTING BUBBLES FROM HERMETIC CONTAINER AND METHOD OF DETECTING LEAK IN HERMETIC CONTAINER

BACKGROUND OF THE INVENTION

The present invention relates to a method of and an apparatus for detecting bubbles issuing from a hermetic container, such as a valve or a pump, which is immersed in a liquid, and a method of detecting a leak for determining the presence or absence of a leak in a hermetic container by means of a detected bubble signal.

As a conventional method of detecting a leak, as shown in FIG. 6, for instance, a bubble detecting apparatus 1 has been used in which a bubble collecting section 1a formed in the form of a reverse cone is provided in a lower portion thereof, a pocket section 1b is provided in an upper portion thereof, and a liquid level sensor 1c is provided in this pocket section 1b.

In other words, a hermetic container 2, such as a valve or a pump, is immersed in a liquid, a gas is pumped into the interior of the hermetic container 2, bubbles 3 produced from a leaking portion of the hermetic container 2 are collected in the bubble collecting section 1a, and this state is continued until the bubbles cease to escape from the hermetic container 2. The gas remaining in the pocket section 1b in the upper portion of the bubble detecting apparatus 1 pushes down the liquid level, and the entire volume of the bubbles is measured by detecting the liquid level by means of the liquid level sensor 1c so as to determine the presence or absence of a leak in the hermetic container 2.

With the above-described conventional method of detecting a leak, however, the following problems are encountered since the presence or absence of a leak is determined on the basis of the results of the staying of the bubbles without directly detecting the same.

It is impossible to detect with good accuracy the volume of gas caused by a leak from the hermetic container 2, since both the volume of the bubbles attaching to the periphery of the hermetic container 2 and the volume of the bubbles remaining in recessed portions of the surface of the hermetic container 2 are included in the volume of gas collected by the bubble detecting apparatus 1.

Since the gas collected in the gas detecting apparatus 1 is measured without directly detecting the bubbles, it takes time to determine the presence or absence of a leak. Although this time varies depending on the type of hermetic container, it generally takes three to ten minutes for the adherent bubbles to disappear.

In addition, since the liquid level varies due to the expansion of the gas caused by its temperature, and since a small volume of bubbles causes substantially no change in the liquid level, the accuracy of the measured value has been low and reliability has been lacking.

SUMMARY OF THE INVENTION

Accordingly, an object of the present invention is to provide a method of and an apparatus for detecting bubbles in which the bubbles escaping from a hermetic container or the like when it is immersed in a liquid are detected as electrical signals in order to accurately determine a leak in the hermetic container, and a method of detecting a leak in the hermetic container on the basis of said electric signals, thereby overcoming the above-described drawbacks of the conventional art.

In a method of detecting bubbles in accordance with the present invention, a hermetic container, i.e., an object to be measured, is immersed in a liquid, and pressurized air is applied to this hermetic container to produce bubbles from a leaking portion. These bubbles are allowed to pass between a pair of optical fibers provided with a gap therebetween. At that time, a light beam emitted from one optical fiber and received by the other optical fiber is radiated across the intended pathway of the bubbles. When the light beam passes through the bubbles, the beam is diffused by the difference in density between the liquid and the bubbles, and a reduced part of it is received by the other optical fiber. As the amount of light thus received is converted to an electrical signal, the presence or absence of a leak in the hermetic container is determined.

In addition, an apparatus for detecting bubbles for implementing this method comprises a bubble collecting section, a bubble detecting means provided in a throttle section, and a bubble releasing section.

The bubble collection section is arranged to be more widely open toward the lower end portion thereof, while the throttle section is formed in such a manner as to continue from the bubble collecting section. The bubble detecting means is arranged so as to project a light beam to one of the pair of optical fibers arranged with a gap provided therebetween and to cause the other to receive the beam. The bubble releasing section is formed in such a manner as to continue from the throttle section, and its upper end portion is widely open.

As a method of detecting a leak in a hermetic container on the basis of a bubble detected as an electrical signal, this signal is processed by a logical circuit, and the number of pulses (the number of bubbles) or the total of the pulse widths (bubble volume) during a set period of time is detected. As this value is compared with a preset value, a determination is made of the presence or absence of a leak in the hermetic container.

Furthermore, as another method of detecting a leak, bubble signals and timer pulses are input to a logical circuit, and the total number of pulses of the bubble signals that are present during a period when the timer pulses continue is detected. Then, the amount of change in the total number of pulses of the bubble signals in the pulse widths of mutually adjacent timer pulses is determined, and as a result of comparing this value with a preset value, a determination is made of the presence or absence of a leak in the hermetic container.

Moreover, as the pressurization and depressurization of the hermetic container are effected alternately in synchronism with the timer pulses, a determination is made of the presence or absence of a leak in the hermetic container.

Since the methods of the present invention are arranged as described above, the presence of bubbles is directly ascertained as pulse signals, and even if bubbles are present on the wall surface or recessed portions of the hermetic container in addition to leaked bubbles, if the volume and the number of these bubbles are taken into consideration in advance and set as a preset value, as the value detected from the bubble signal during a set period is compared with the preset value, it is possible to accurately determine the presence or absence of a leak in the hermetic container.

DETAILED DESCRIPTION OF THE PREFERRED EMBODIMENTS

Referring now to the accompanying drawings, description will be given of the preferred embodiments of the present invention.

Figure 1:
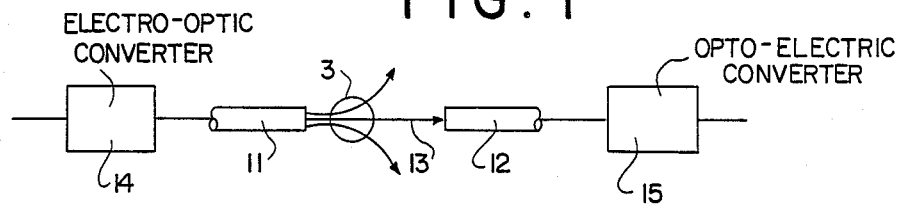
FIG. 1 is a diagram schematically illustrating the basic principle of a method of detecting bubbles in accordance with the present invention.

In the present invention, bubbles escaping from a leaking portion of a hermetic container are detected as electrical signals, and the presence or absence of a leak is determined on the basis of these signals. First, a description will be given of its basic principle with reference to FIG. 1.

A pair of optical fibers 11, 12 are disposed in a liquid with a gap 13 provided therebetween. A constant-voltage electrical signal is converted to an optical signal (light beam) by an electro-optic converter 14 and is emitted from the optical fiber 11. An opto-electric converter 15 is connected to one end of the light-receiving optical fiber 12 to obtain an electrical signal corresponding to the amount of light received. Accordingly, if a bubble detecting apparatus is arranged in such a manner as to allow bubbles to pass between the optical fibers 11, 12, it is possible to convert the size and the number of bubbles, etc. into electrical signals.

Figure 2:
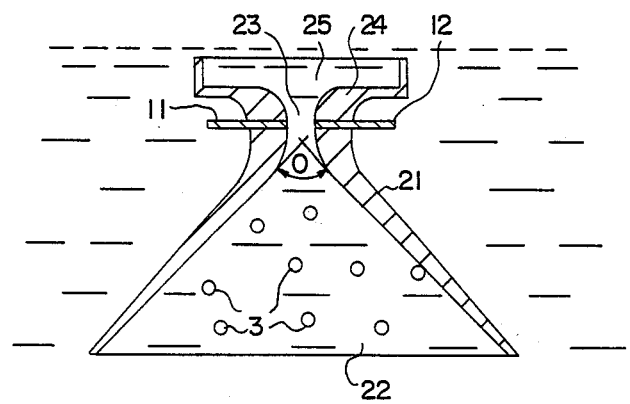
FIG. 2 is a vertical cross-sectional view illustrating an embodiment of an apparatus for detecting bubbles for obtaining a bubble signal.

Referring now to FIG. 2, a description will be given of a specific arrangement of this bubble detecting apparatus.

A bubble detecting apparatus 21 has a bubble collecting section 22, a bubble detecting means provided in a throttle section 23, and a bubble releasing section 25.

The bubble collecting section 22 having a conical shape which is more widely open toward its lower end is provided in the lower portion of the bubble detecting apparatus 21. The inner wall surface of the bubble collecting section 22 is formed to a mirror finish which is free from uneven surfaces. The arrangement is such that, when the bubble detecting apparatus 21 is placed in a liquid, bubbles 3 produced from the hermetic container will flow smoothly. In addition, the angle $\theta$ of expansion of the bubble collecting section 22 is preferably 120 degrees or below so as to facilitate the smooth upward movement of the bubbles 3.

The throttle section 23 having the shape of a cylindrical hole is formed on top of the bubble collecting section 22 in such a manner as to continue from the bubble collecting section 22. This throttle section 23 is formed so that a light beam emitted from an optical fiber, which will be described below, can be radiated to all the bubbles 3 rising in the liquid, and the accuracy of detecting the bubbles 3 can be enhanced.

The pair of optical fibers 11, 12, which serve as a bubble detecting means, are provided on a wall portion 24 of the throttle section 23 in such a manner as to oppose each other with the throttle section 23 interposed therebetween, thereby forming the bubble detecting section. As an optical signal, a constant-voltage electrical signal is applied to the optical fiber 11 via the electro-optic converter 14. The opto-electric converter 15 is connected to one end of the light-receiving optical fiber 26 so as to obtain a pulse signal corresponding to the amount of light received. A horizontal cross section of the throttle section 23 is formed into an elongated oblong shape in the direction in which the pair of optical fibers 11, 12 are opposed to each other. The arrangement is such that bubbles passing through the throttle section 23 are transmitted through a light beam emitted from the optical fiber 11.

The bubble releasing section 25 which is more widely open toward the upper end thereof is formed on top of the throttle section 23 in such a manner as to continue from the same. The bubble releasing section 25 is provided to prevent the bubbles 3 moving upward after passing through the bubble detecting section from remaining in the vicinity of the throttle section 23 and becoming mixed with the bubbles 3 rising from below. Thus, the bubble releasing section 25 has a widely open upper end to facilitate the smooth upward movement of the bubbles 3.

A description will now be given of a method of detecting bubbles issuing from a hermetic container by the use of this bubble detecting apparatus 21.

First, a hermetic container is placed in a liquid, and a gas is pumped into the interior of the hermetic container. If leakage has occurred in the hermetic container, bubbles escape from a leaking portion and rise upward in the liquid. In addition, bubbles attached to the peripheral surfaces of the hermetic container also rise upward in the liquid when the hermetic container is placed in the liquid.

When the bubble 3 rising upward in the liquid passes through the gap 13 between the optical fibers 11, 12, the light beam emitted from the optical fiber 11 is made incident upon the bubble 3. Due to the difference in density between the air in the bubble 3 and the liquid, part of the incident beam is refracted at the interface between the liquid and the air and the interface between the air and the liquid, and is diffused with respect to the incident beam. Accordingly, if the bubble 3 is present in the gap 13, the amount of light received by the optical fiber 12 is reduced. In addition, in the case of a large bubble, the time duration when the amount of light received by the optical fiber 12 is reduced continues for a prolonged period of time. The opto-electric converter 15 is connected to the optical fiber 12, and detects as an electrical signal the amount of light received, which contains information on the volume and the number of the bubbles, and so forth.

In other words, if this electrical signal is expressed as a pulse signal, the number of bubbles can be expressed by the number of pulses, and the volume of the bubble by the sustained period of the pulse.

Hereafter, a description will be given of a method of detecting a leak in a hermetic container on the basis of a bubble signal constituted by a pulse signal thus obtained.

Figure 3:
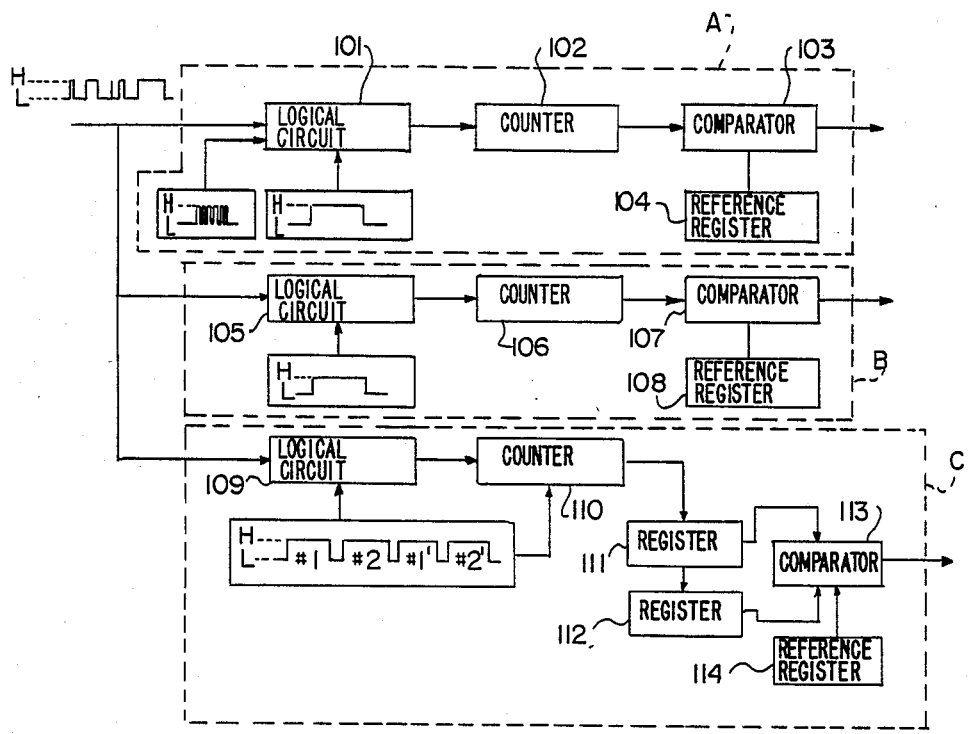
FIG. 3 is a block diagram illustrating an embodiment of a method for detecting a leak on the basis of a bubble signal.

The pulse signal (it is assumed that the bubble 3 is present in the throttle section 23 when the pulse is at the "H" level) is input to a leak determining device A, a leak determining device B, and a leak determining device C, respectively, as shown in FIG. 3.

The leak determining device A determines the presence or absence of a leak on the basis of the value of the total volume of bubbles.

The bubble signal is input to a logical circuit 101 serving as an AND gate, and a clock pulse having a frequency which is 10 to 100 times the frequency of the bubble signal and a timer pulse which outputs a signal of the "H" level during a preset measuring time (set time) are also input to the logical circuit 101. In addition, the logical circuit 101 outputs a pulse of the "H" level when all of the bubble signal, the clock pulse, and the timer pulse are at the "H" level.

The pulses thus output from the logical circuit 101 are supplied to a counter 102 where the number of pulses is counted. Accordingly, it is possible to detect how many clock pulses can be present during the time when bubbles which have passed through the throttle section 23 are interrupting the light beam, namely, it is possible to detect the total pulse widths of pulses which have passed the throttle section 23, i.e., the total volume of the bubbles.

The count of pulses detected by the counter 102 is input to a comparator 103 which compares that count with a set value stored in a reference register 104. The set value is a predetermined reference value for determining the presence or absence of a leak, and, when the count is greater than the set value, it is assumed that a leak has occurred, and a signal to that effect is output from the comparator 103. As for the set value, the total volume of bubbles which were attached to the periphery of a non-leaking leaking hermetic container and have passed through the throttle section 13 within a predetermined time (set time) is accumulated as data, and the set value is determined from this value.

The leak determining device B determines the presence or absence of bubbles on the basis of the total number of bubbles.

The bubble signal is input to a logical circuit 105 serving as an AND gate, and a timer pulse for outputting a signal of the "H" level during a predetermined measuring time (set time) is also input to the logical circuit 105. Then, when both the bubble signal and the timer pulse are at the "H" level, the logical circuit 105 outputs a pulse of the "H" level.

The pulses thus output from the logical circuit 105 are input to a counter 106 where the number of pulses is counted. Accordingly, it is possible to detect the number of times when the bubbles which have passed through the throttle section 23 interrupt the light beam, i.e., the total number of bubbles which have passed through the throttle section 23.

The count of the pulses detected by the counter 106 is input to a comparator 107 where that count is compared with a set value stored in a reference register 108. The set value is a predetermined reference value for determining the presence or absence of a leak, and when the count is greater than the set value, it is assumed that a leak has occurred, and a signal to that effect is output from the comparator 107. As for this set value, the total number of bubbles which were attached to the periphery of a non-leaking hermetic container and have passed through the throttle section 13 within a predetermined time (set time) is accumulated as data, and the set value is determined from this value.

The leak determining device C determines the presence or absence of a leak on the basis of the amount of change in the total number of bubbles occurring within the same measuring time.

The bubble signal is input to a logical circuit 109 serving as an AND gate, and a timer pulse having a fixed period is also input to the logical circuit. When both the bubble signal and the timer pulse are at the "H" level, the logical circuit 109 outputs a pulse of the "H" level.

The pulses thus output from the logical circuit 109 are input to a counter 110 where the number of pulses is counted. Timer pulses are also input to the counter 110 which starts counting the pulses sent from the logical circuit 109, in synchronism with the rise of the timer pulse, and completes the counting of the pulses sent from the logical circuit 109, in synchronism with a fall of the timer pulse. Accordingly, the number of pulses sent from the logical circuit 109 is determined sequentially within the sustained time of No. 1 pulse, No. 2 pulse, . . .

The count of pulses detected by the counter 110 is temporarily stored in a register 111, and is shifted to a register 112 simultaneously as a count concerning an ensuing pulse is input to the register 111. In other words, the count N1 of the number of bubbles produced when the initial No. 1 pulse of the timer pulse is at the "H" level is stored in the register 111. Then, the count N2 of the number of bubbles produced when a second No. 2 pulse of the timer pulse is at the "H" level is stored in the register 111, and, at the time time, the aforementioned count N1 is shifted to the register 112 and is stored therein. When the count of the number of bubbles occurring at a third No. 1' pulse is stored in the register 111, the count of the numbers of bubbles occurring at No. 2 pulse is stored in the register 112. Accordingly, the counts of the numbers of bubbles occurring at No. 1 pulse and No. 2 pulse, the counts of the number of bubbles occurring at No. 2 pulse and No. 1' pulse, and the counts of the numbers of bubbles occurring at No. 1' pulse and No. 2' pulse are sequentially stored in the order mentioned in the register 111 and the register 112, respectively.

The counts temporarily stored in the registers 111, 112 are respectively input to a comparator 113. At this comparator 113, the amounts of change which are absolute values of the difference between the count of bubbles occurring at No. 1 pulse and the count of bubbles occurring at No. 2 pulse, between the count of bubbles occurring at No. 2 pulse and the count of bubbles occurring at No. 1' pulse, and between the count of bubbles occurring at No. 1' pulse and the count of bubbles occurring at No. 2' pulse, i.e., amounts of change in the total number of pulses of the bubble signal in the pulse-widths of mutually adjacent timer pulses, are determined sequentially. Furthermore, a comparison is made between this amount of change and a set value stored in the reference register 114. The set value is a predetermined reference value for determining the presence or absence of a leak, and when the amount of change in the count is greater than the set value, it is assumed that a leak has occurred, and a signal to that effect is output from the comparator 113.

As for this set value, differences between total numbers of bubbles which were attached to the periphery of the non-leaking hermetic container and have passed through the throttle section 23 during No. 1 timer pulse and during No. 2 timer pulse, etc. are accumulated as data, and the set value is determined from that value. In other words, an amount of change in the number of bubbles during a fixed period of time is detected, and when that value is greater than the set value, it is determined that a leak has occurred.

In accordance with this embodiment, it is possible to ascertain the presence of bubbles directly as pulse signals, and even if bubbles are present on wall surfaces and recessed portions of a hermetic container in addition to leaked bubbles, if the volume and number of these bubbles are taken into consideration and set at predetermined values, as the value detected from a bubble signal during a set time is compared with the set value, it is possible to accurately determine the presence or absence of a leak in the hermetic container. Furthermore, since the presence or absence of a leak is determined on the basis of the amount of change of bubbles that occur, the effect which the bubbles staying at the wall surfaces or recessed portions have on the amount of change is small, so that it is possible to accurately determine the presence or absence of a leak in the hermetic container.

In addition, since an amount of change is detected, it is possible to determine within a relatively short period of time whether or not a leak has occurred in the hermetic container.

Although in this embodiment a combination of the leak determining device A, the leak determining device B, and the leak determining device C is used, if they are respectively used independently, a sufficient advantage in determining a leak can be obtained depending on the type of hermetic container. In addition, among the bubbles that exist, there are those that have varying diameters, and, for instance, even if there is only one bubble, if the bubble is large, it means that the leakage is large. The presence or absence of a leak can be determined accurately if a large bubble is detected through its volume, and small ones are detected by their number. Accordingly, by combining the leak determining device A, the leak determining device B, and the leak determining device C, it is possible to determine the presence or absence of a leak with high accuracy and reliability.

Furthermore, as for the leak determining device C, if pressurization and depressurization are effected alternately with respect to the interior of the hermetic container 2 in synchronism with timer pulses, it is possible to more accurately detect a leak by creating a difference in the volume of bubbles formed.

Figure 4:
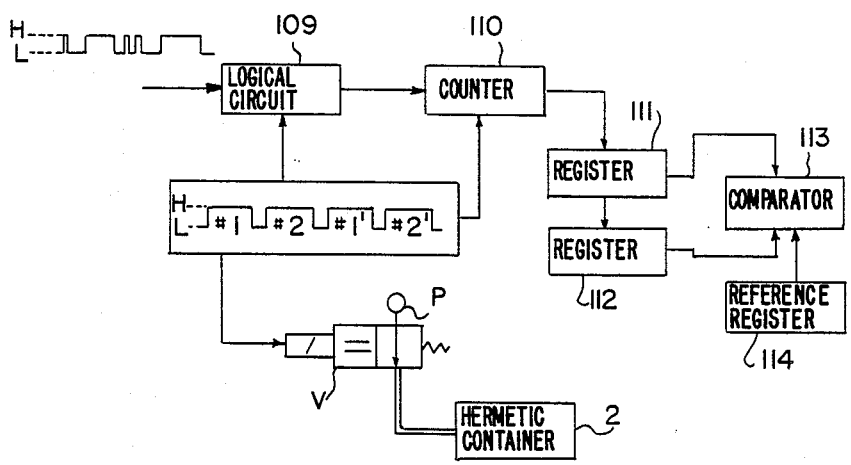
FIG. 4 is a block diagram illustrating another embodiment of the method of detecting a leak on the basis of a bubble signal.

For instance, as shown in FIG. 4, a signal synchronized with a timer pulse is imparted to a control unit of a changeover valve V, which is thereby changed over in synchronism with the timer pulse. As a result, pressure from a pump P communicating with the hermetic container 2 is controlled, thereby adjusting the pressure within the hermetic container 2. In other words, the connection of the changeover valve V is controlled by the timer pulse in such a manner that the changeover valve is connected so as to increase the pressure within the hermetic container 2 upon receipt of No. 1 timer pulse and to decrease the pressure within the hermetic container 2 upon receipt of No. 2 timer pulse. Subsequently, pressurization and depressurization are repeated upon receipt of No. 1' pulse and No. 2' pulse, and the pressure within the hermetic container 2 is thus alternately increased or decreased in synchronism with the timer pulse.

When the hermetic container 2 is placed in a liquid, bubbles attached to recessed portions and threaded holes on the surface of the hermetic container 2 rise upward in the liquid, and it has been confirmed that the number of these bubbles decreases with a lapse of time. However, the number of these bubbles is increased or decreased substantially when a certain impact is applied to the hermetic container 2. In this embodiment, the pressurization and depressurization of the interior of the hermetic container 2 are conducted alternately in synchronism with the timer pulses, and when a leak has occurred in the hermetic container 2, a large difference is caused in the amount of bubbles produced, by effecting pressurization and depressurization.

Figure 5:
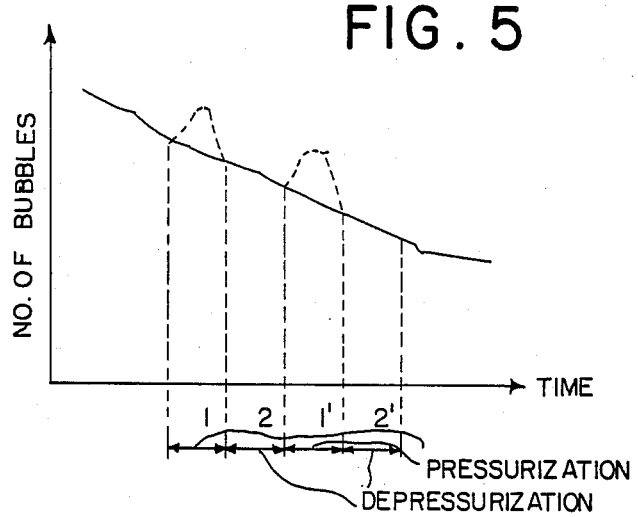
FIG. 5 is a graph illustrating the number of bubbles when pressurization and depressurization of a hermetic container are performed in accordance with the embodiment of the present invention.
Figure 6:
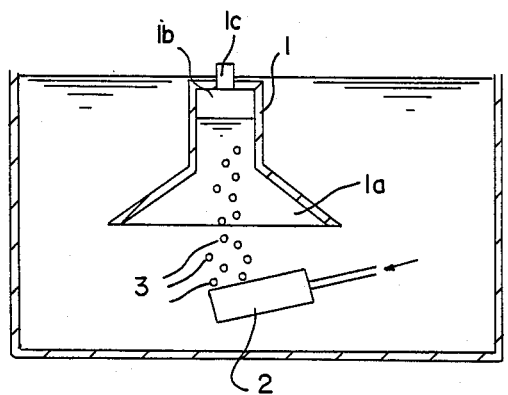
FIG. 6 is a diagram illustrating a conventional method of detecting a leak.

If the hermetic container 2 is placed in a liquid and set to be stationary in a state in which a gas is supplied to the hermetic container 2, the number of bubbles 3 detected by the bubble detecting apparatus 21 decreases with time, as indicated by the solid line in FIG. 5. At this time, if pressurization and depressurization of the interior of the hermetic container 2 are conducted alternately in synchronism with the timer pulses, if a leak has occurred in the hermetic container 2, the number of bubbles increases, as indicated by the dotted line, during pressurization at No. 1 timer pulse and No. 1' timer pulse. Accordingly, the amount of change between the count of bubbles occurring at No. 1 pulse and the count of bubbles occurring at No. 2 pulse becomes large, thereby making it possible to positively determine the presence of a leak.

In addition, in a case where an amount of bubbles similar to that at the time of pressurization is detected at the time of depressurization, it is judged that bubbles are occurring due to another cause (e.g., an impact), and it is determined that no leakage has occurred in the hermetic container even if the amount of change between the count of bubbles occurring at No. 1 pulse and the count of bubbles occurring at No. 2 pulse is small and the number of bubbles is numerous. In other words, it is possible to determine the presence or absence of a leak with high reliability by alternately conducting the pressurization and depressurization of the interior of the hermetic container 2 in synchronism with the timer pulses.

What is claimed is:

1. A method of detecting bubbles issuing from a hermetic container, i.e., an object to be measured, which is immersed in a liquid, comprising the steps of:

applying atmospheric pressure to said hermetic container to allow bubbles to be produced from a leaking portion;

allowing said bubbles to pass through a pair of optical fibers arranged with a gap therebetween, a light beam emitted from one of said optical fibers and received by the other being constantly radiated across the intended pathway of said bubbles, said light beam being diffused due to a difference in density between said liquid and each bubble when said light beam is transmitted through successive bubbles, and part thereof is received by said other optical fiber whereby the bubbles produce pulse signals in the light beam;

inputting said pulse signals and timer pulses to a logical circuit to detect the total number of pulses of the pulse signals that are present during a period when said timer pulses continue;

determining the amount of change in the total number of pulses of said pulse signals in the pulse widths of mutually adjacent timer pulses; and comparing the value thus determined with a preset value to determine the presence or absence of a leak in said hermetic container.

2. An apparatus for detecting bubbles comprising:
a bubble collecting section,
bubble detecting means provided in a throttle section, and
a bubble releasing section,
wherein said bubble collecting section is more widely open toward the lower end portion thereof, and said throttle section is formed in such a manner as to continue from said bubble collecting section, said bubble detecting means being arranged such that a light beam is emitted from one of a pair of optical fibers arranged with a gap therebetween and that the other one of said pair of optical fibers receives said light beam, said bubble releasing section being formed in such a manner as to continue from said throttle section and having a widely open upper end portion.

3. A method of detecting a leak in a hermetic container, comprising the steps of:

applying pressurized air to a hermetic container immersed in a liquid to cause bubbles to escape from said hermetic container;

converting the bubbles thus formed into pulse signals to obtain bubble signals by passing the bubbles through a gap between a pair of optical fibers with a light beam emitted therebetween whereby the bubbles continually diffuse the beam to form the pulse signals;

processing said bubble signals by a logical circuit to detect the number of said pulse signals (representing the number of bubbles) or the total of pulse widths (representing the volume of bubbles) during a set time; and comparing the detected value with a predetermined value to determine the presence or absence of a leak in said hermetic container.

4. A method of detecting a leak in a hermetic container, comprising the steps of:

applying pressurized air to a hermetic container immersed in a liquid to cause bubbles to escape from said hermetic container;

converting the bubbles thus formed into pulse signals to obtain bubble signals;

inputting said bubble signals and timer pulses to a logical circuit to detect the total number of pulses of the bubble signals that are present during a period when said timer pulses continue;

determining the amount of change in the total number of pulses of said bubble signals in the pulse widths of mutually adjacent timer pulses; and comparing the value thus determined with a preset value to determine the presence or absence of a leak in said hermetic container.

5. A method of detecting a leak in a hermetic container according to claim 4, wherein the pressurization of said hermetic container is conducted alternately with depressurization of said container in synchronism with said timer pulses.

* * * * *

Notice of Adverse Decisions in Interference

In Interference No. 102,684, involving Patent No. 4,903,524, S. Kataoka, Y. Hasegawa, H. Muroda, METHOD OF AND APPARATUS FOR DETECTING BUBBLES FROM HERMETIC CONTAINER AND METHOD OF DETECTING LEAK IN HERMETIC CONTAINER, final judgment adverse to the patentees was rendered June 9, 1992, as to claims 1-5.

*(Official Gazette August 25, 1992.)*